United States Patent [19]

Polinski

[11] 4,220,559

[45] Sep. 2, 1980

[54] HIGH TEMPERATURE-STABLE CATALYST COMPOSITION

[75] Inventor: Leon M. Polinski, North Plainfield, N.J.

[73] Assignee: Engelhard Minerals & Chemicals Corporation, Iselin, N.J.

[21] Appl. No.: 877,775

[22] Filed: Feb. 14, 1978

[51] Int. Cl.$^2$ .................... B01J 29/06; B01J 23/10; B01J 23/16

[52] U.S. Cl. ................... 252/455 R; 252/462; 252/463; 252/465

[58] Field of Search ............... 252/455 R, 462, 463, 252/465

[56] References Cited

U.S. PATENT DOCUMENTS

| | | | |
|---|---|---|---|
| 3,966,790 | 6/1976 | Hindin et al. | 252/465 |
| 4,056,489 | 11/1977 | Hindin et al. | 252/462 |

*Primary Examiner*—Carl F. Dees

[57] ABSTRACT

Catalysts having good high temperature stability which are particularly useful for carrying out high temperature reactions, such as combustion reactions at temperatures of the order of 1000°–1400° C., are disclosed. The catalytically active materials include precious metals, base metals or their oxides, or precious metals in combinstion with base metals, deposited on a catalyst slip or composite which contains alumina in admixture with a metal oxide component. The metal oxide component consists of a mixture of strontia or barium oxide with either molybdenum trioxide, zirconia, silica, or stannous oxide, or of a mixture of lanthana with either silica or stannous oxide. The slips or carrier compositions are calcined at a temperature of at least 500° C. before deposition of the precious metal or base metal material, and are characterized by having a surface area of at least 20 m$^2$/g after calcination at a temperature of 1200° C. for 4 hours.

10 Claims, No Drawings

HIGH TEMPERATURE-STABLE CATALYST COMPOSITION

BACKGROUND OF THE INVENTION

This invention relates to catalyst compositions, and in particular to catalyst compositions characterized by high stability, thereby maintaining good catalytic activity when used in reactions carried out at temperatures in excess of 1000° C. Cataylst compositions exhibiting a relatively high surface area per unit weight are desirable to allow the largest amount of reactants to contact the catalyst. Additionally, high surface area is important when the catalyst composition contains a precious metal such as platinum because of the cost of the metal and because of the dispersion required to prevent undue metal crystallite growth. It is desirable to retain this high surface area for long periods of use under severe conditions which might include reaction temperatures of the order of 1000°–1400° C. Thus combustion reactions advantageously are carried out in the presence of such a catalyst at temperatures of 1200° C. or higher for extended periods.

Alumina is an excellent and relatively economical carrier or support for many catalysts. Many crystalline forms of alumina, for example, chi, kappa, gamma, delta, eta, and theta, exhibit a very high surface area in relation to their weight. A serious drawback of alumina as a catalyst carrier, however, is its transition temperature of about 1000°–1200° C. to the alpha form which results in a substantial reduction of the surface area. It is thus extremely desirable to stabilize alumina-containing catalyst compositions based on high surface area aluminas to substantially prevent the transition to the low surface alpha form with a consequent loss in activity. A variety of catalyst slips or composites have been developed heretofore including chromium in oxidic form, as the oxide chromia ($Cr_2O_3$), or possibly as a salt or in solid solution with other metal oxides, depending on the mechanism by which the oxidic composite is produced from its precursors in the form of salts, mixtures of oxides, and the like. Such slips made up of alumina calcined with oxidic materials including chromia are disclosed and claimed in U.S. Pat. Nos. 3,966,790 and 4,056,489, issued June 29, 1976, and Nov. 1, 1977, to S. G. Hindin and G. R. Pond, assignors to the assignee of the present invention; these two patents are incorporated herein by reference. These patents cover, inter alia, catalytically-active materials of alumina containing alkaline earths and an oxide of chromium or tungsten. Also covered are alumina composites containing alkaline earths, chromia, and zirconia; alkaline earths, chromia, and silica; alkaline earths, chromia, and SnO; rare earth metal oxides, chromia, and silica; and rare earth metal oxides, chromia, and SnO.

It now has been discovered that catalyst composites of good thermal stability, and in some cases of superior stability, may be formed of a calcined composite containing certain alkaline earths and molybdenum trioxide ($MoO_3$, which may be identified as molybdena), the latter replacing chromium oxide or tungsten oxide, and also may be formed of the various other composites mentioned hereinabove but omitting the chromia ingredient from the composite.

It is therefore an object of this invention to provide catalyst compositions, including suitable methods for their preparation and advantageous applications to reactions at high temperatures, which exhibit thermal stability. Other objects and advantages will appear as the description proceeds.

In accordance with the invention, a catalyst composition consists essentially of (a) a catalytically active calcined composite of alumina and a metal oxide component, this component being selected from the group consisting of mixtures of: a higher alkaline earth and molybdenum trioxide, a higher alkaline earth and zirconia, a higher alkaline earth and silica, a higher alkaline earth and tin oxide, lanthana and silica, and lanthana and tin oxide, such composite having been formed by calcination of alumina in admixture with said metal oxide component at a temperature of at least 500° C. and being characterized by a surface area of at least 20 $m^2/g$ when heated for 4 hours at 1200° C.; and (b) a material incorporated in such calcined composite in catalytically effective amount, selected from the group consisting of precious metals, base metals or their oxides and precious metals in combination with base metals or their oxides.

The alkaline earths are the oxides of the alkaline earth metals, which are not found in nature uncombined. As used herein, the term "higher alkaline earths" may be defined as including strontia (SrO) and barium oxide (BaO) while excluding calcium oxide, which is the oxide of the alkaline earth metal of lower atomic number; this term, of course, also excludes the oxides of beryllium and magnesium, sometimes grouped with the alkaline earth metals. As a practical matter, radium obviously should not be included among the higher alkaline earth metals for present purposes, so that the term "higher alkaline earth" as used in the present specification and in the appended claims is taken to be limited to SrO, BaO, or mixtures thereof.

It will appear hereinbelow that mixtures of certain rare earth metal oxides with either stannous oxide (SnO) or silica have been found to be useful in forming with alumina ($Al_2O_3$) a calcined composite which provides improved high temperature stability. Outstanding for this purpose are mixtures of lanthana ($La_2O_3$) and tin oxide and mixtures of lanthana and silica. A minor portion of the lanthana may be replaced by one or more of the lower rare earth metal oxides neodymia ($Nd_2O_3$), praseodymia ($Pr_6O_{11}$), and samaria ($Sm_2O_3$), which contribute to the stabilizing effect of lanthana, so that such mixtures of tin oxide or silica with lanthana in major proportion and with one or more of the oxides neodymia, praseodymia, and samaria in minor proportion are the equivalent of mixtures of tin oxide or silica with lanthana alone for stabilizing alumina. Oxides such as those of the metals Ce, Gd, Dy, Er, Yb, and Y, while not counteracting the stabilizing effect of lanthana if included in minor proportions in such mixtures, are generally ineffective in contributing to high temperature stability in the catalyst compositions of the present invention.

The composite is formed by the calcination of an aluminum compound in intimate admixture with a compound or compounds containing the metal oxide component, the metal of the metal oxide component being strontium or barium with molybdenum, zirconium, silicon, or tin, or alternatively being lanthanum with silicon or tin. The aluminum compound conveniently may be alumina itself. The compound or compounds which are precursors of the metal oxide component, if not already in oxide form, must be capable of forming or yielding their respective oxides upon calcination in air (oxygen) at a temperature of at least 500° C. The combination of the strontium or barium oxide and the other metal (or metalloid) oxide, or the combination of lanthana with silica or tin oxide, may be considered as a high temperature stabilizing component for the alumina.

The relative amounts of alumina and of this stabilizing component, and indeed the proportions of the oxides in the stabilizing component, are governed largely by empirical criteria. While it is not desired that this invention be limited by the following theory, a belief statement may provide a helpful framework to further elucidate the invention. It is thought that the addition of the stabilizing component to the alumina or alumina precursor and calcination of the mixture at a temperature of at least 500° C. converts any of the non-oxide compounds to oxides and allows the stabilizing component oxides to enter the alumina lattice and prevent or substantially reduce subsequent transition to alpha alumina.

All surface areas throughout the specification and the appended claims are measured by the Brunauer, Emmett, Teller (B.E.T.) or equivalent method.

The calcined composite may be formed to any desired shape, such as a powder, beads, rings, cylinders, or pellets. This shaping or fabricating is accomplished before calcination to promote particle adhesion. However, an unstabilized, preformed or preshaped alumina may be precalcined before admixture with stabilizers as long as a final calcination is carried out subsequently. After final calcination, a catalytically effective material, such as a platinum group metal is added to the composite. Additionally, the composite can be applied or deposited on a relatively inert support or substrate and the platinum group metal then added, or the catalyst composition can be applied or deposited onto the inert support.

For composites made in accordance with this invention, the composite generally comprises about 80 to 98 mol percent alumina and between about 1 and about 10 mol percent of each of the metal oxides in the stabilizing component. These metal oxides are calculated as mols of the metal, not the oxide, so that each mol of lanthana, $La_2O_3$, for example, is included as two mols of lanthanum metal, La, in determining the number of mols of each species in the stabilizing component relative to the number of mols of alumina calculated as the oxide $Al_2O_3$.

Generally, to provide the advantages of this invention, it is necessary for the stabilizing component to be in intimate association with the alumina during pre-calcining. An intimate admixture may be achieved, for example, by forming a slurry of alumina with water soluble compounds of the stabilizing components. Where desired, unhydrated alumina, such as aluminum oxide in the gamma phase, is admixed with aqueous solutions of a mixture of the other metal salts of this invention to permit sorption of the stabilizing components by the alumina. The solids are then recovered from the slurry, for example, by spray-drying, and calcined to provide the mixed oxide composite. The particulate alumina is preferably in finely divided or colloidal form to provide maximum sorption area. For example, finely divided freshly precipitated aluminum oxide monohydrate or unhydrated gamma alumina or eta alumina having a particle size of 70 percent to 90 percent smaller than 325 mesh is useful. When large particle size alumina is used, the sorption of the stabilizing components from solution and subsequent calcination will provide at least a stabilized outer portion of the alumina; further, if an optimum amount of solution is used, sorption via osmosis will insure a more or less uniform stabilization in all portions of the alumina.

The intimate admixture of alumina and stabilizing components is calcined at a temperature of at least about 500° C., preferably about 700° to 1200° C., but not at such a high temperature or for such a long period of time as to unduly sinter the composite. The conditions of the calcination are such as to provide a catalytically-active composite having a relatively high surface area of at least about 20 $M^2/g$ and preferably at least about 30 $m^2/g$. Calcination is preferably conducted while (a) the admixture is unsupported and in freeflowing condition, or (b) the admixture is in a final geometrical shape such as an extrudate or a ring. This is preferable for economic reasons and to prevent undue sintering.

Calcination in air to form the composite, and prior to the addition of a platinum group metal, is a feature of the present invention. It is found that an intimate admixture of the stabilizing components and the alumina is stable when calcined at such temperatures before any further preparative steps are performed. Since both the alumina and the stabilizing components are intimately admixed, the concurrent heating in close association substantially reduces any undesirable alumina transitions. Additionally, calcination before deposit on an inert substrate promotes adhesion of the calcined composite to the substrate, thus allowing the use of higher space velocities with the finished catalyst composition with less chance of erosion. Further, calcination substantially reduces the possibility of undesirable reaction of the stabilizing component and alumina component with the substrate. Any such reactions between the alumina and the substrate promote the formation of inactive forms of alumina thereby reducing its surface area and activity. If the stabilizing component were to react with the substrate, it would reduce the effective amount of this component available for stabilization. A further advantage of such calcination is economic because less heat in smaller furnaces is required to calcine the resulting powder composite before it is placed on an inert support. Further, it is essential that the calcination is conducted before the addition of a platinum group metal component to prevent loss of such component by occlusion. In the case of base metals, calcination is particularly needed to prevent deactivation of the base metal by interaction with activated alumina or with the stabilizer precursors.

Suitable aluminum-containing compounds are alumina, the gamma, eta, kappa, delta, and theta forms of alumina, and boehmite (aluminum oxide monohydrate). It may be convenient to coprecipitate all of the components, including the alumina, from aqueous solutions. For this purpose there may be used the water soluble aluminum compounds such as salts, for example, the aluminum halides, aluminum nitrate, aluminum acetate, and aluminum sulfate. Water soluble precursors of the metal oxides in the stabilizing component may be the acetates, halides, nitrates, sulfates, and the like, for example strontium nitrate and barium nitrate or acetate. The halides and sulfates of tin are useful as well as certain dispersions of high surface area, low sodium, colloidal silica having a very small particle size, for example, a product marketed by Du Pont de Nemours & Co., under the registered Trademark Ludox LS is particularly suitable. This silica sol contains about 30% by weight $SiO_2$ in water, has a particle size of about 15 millimicrons, a 285 SiO$_2$ to Na$_2$O ratio and a surface area of about 200 m$^2$/g.

After calcination of the composite of alumina and the stabilizing metal oxide component, a precious metal or base metal material, or a material containing both, is added to the calcined composite to form the catalyst compositions of this invention, which are effective for catalyzing high temperature reactions over long periods of time. Of the precious metals the platinum group metals are notably useful, advantageously in the form of platinum, palladium, platinum-palladium alloys and mixtures thereof, ruthenium, iridium, and rhodium. Gold and silver are known to be useful for certain reactions. Base metals, usually as the oxide or sulfide, also may be used, by themselves or as promoters or activators in combination with a precious metal. Such base metal ingredients may include, for example, manganese, vanadium, copper, iron, cobalt, and nickel. The choice of precious metal or metals, base metal or its oxide, or both is governed by activity or selectivity for a given reaction, volatility, deactivation by specific components encountered in the reaction mixture, and economics. Generally, with platinum group metals the amount may vary from 0.05 to 20 percent of the weight of the calcined composite, usually between about 0.2 and 10 percent, while base metals or their oxides conventionally are used in larger precentages and may be as high as 60 percent of the total weight of the catalyst.

It often is found to be convenient for the catalyst compositions of this invention to have a relatively catalytically-inert support or substrate, which may be in particle form such as pellets or spheres of various sizes, having a dimension as small as 1/64 inch or as large as 1 inch. Preferably, however, the supports are unitary, skeletal structures of relatively large size, e.g., honeycombs. The materials, shapes, and dimensions of such inert supports are discussed in the Hindin and Pond patents referred to hereinabove, and are generally known in the art, so that further description is considered unnecessary here. The calcined composite of alumina and stabilizing component may be applied to the support from an aqueous slurry and dried, after which the catalytically effective material is added to the coated support, or such material may be added to the slurry before the coating operation. Alternatively the alumina and metal oxide component, as their precursors, may be deposited or precipitated from aqueous solution on an inert support, followed by calcining and then addition of the precious metal or base metal in catalytically effective amount.

The following are examples of the general method of preparation of some representative stabilized catalytic composites and compositions of this invention.

EXAMPLE 1

A composite of roughly 5 mol % Ba, 5 mol % Mo, and 90 mol % Al$_2$O$_3$ are prepared. 38.34 grams of Ba(NO$_3$)$_2$ is dissolved in water by warming to 55° C. and diluted to 401 ml. To this solution is added 255 grams of commercial powdered gamma alumina having a surface area of about 300 m$^2$/g. The slurry is partially dried with a heat lamp and the drying completed overnight at 110° C. to recover 302 grams of material which is crushed to powder containing 0.546 mol Al$_2$O$_3$ and 0.0321 mol Ba (mol ratio 17.0). To 60.6 grams of this powder are added 4.0 grams (0.0278 mol) MoO$_3$ as 100 ml of an aqueous slurry at 95° C. in which the MoO$_3$ is mostly dissolved. This slurry is stirred, partially dried 2 hours with a heat lamp, and dried overnight. The resulting solids are ground to powder, then calcined at 1200° C. for 4 hours. The proportions calculated more exactly for this calcined composite, nominally 5-5-90, are 4.6 mol % Mo, 5.3 mol % Ba, and 90.1 mol % Al$_2$O$_3$. The surface area after such calcination is found to be 37.5 m$^2$/g.

EXAMPLE 2

An alternative preparation of a composite having the same amounts of oxides in the same proportions as that of Example 1 utilizes 4.91 grams of ammonium molybdate, (NH$_4$)$_6$Mo$_7$O$_{24}$.4H$_3$O, the molybdic acid of commerce, equivalent to 4.0 grams MoO$_3$. The molybdate is dissolved with heating in 50 ml H$_2$O, to which is added again 60.6 grams of the powder produced in Example 1 containing Al$_2$O$_3$ and BaO in a mol ratio of 17.0. An additional 25 ml H$_2$O are added and the material mixed well, followed by heating under the lamp for 1 hour, drying overnight, and grinding to powder. B.E.T. measurement after calcining this powder for 4 hours at 1200° C. gives a surface area of 23.6 m$^2$/g, lower than in Example 1 but high enough to provide good activity when used as a catalyst support.

EXAMPLE 3

A strontia-molybdena-alumina composite is prepared. SrO and Al$_2$O$_3$ are mixed in the proportions 5.48:94.52 by weight. 31.0 grams of Sr(NO$_3$)$_2$ are diluted to 400 ml and mixed with 255 grams of powdered gamma Al$_2$O$_3$, −40 mesh. The mixture is heat-lamp dried and weighed 293 grams after drying for 16 hours at 110° C. To 58.3 grams of the dried mixture are added 4.21 grams (0.0293 mol) of MoO$_3$ dissolved in 150 ml H$_2$O at 80° C., followed by stirring on a rotating dish while heating until H$_2$O is appreciably removed, then dried overnight at 110° C. in an oven. The dried material is ground and calcined at 1200° C. for 4 hours. The resulting calcined composite of 5.2 mol % Sr, 5.2 mol % Mo and 89.6 mol % Al$_2$O$_3$ has a surface area of 24.0 m$^2$/g.

EXAMPLE 4

A BaO-ZrO$_2$-Al$_2$O$_3$ composite is prepared. A solution of 700 gram (0.030 mol) zirconium tetrachloride, ZrCl$_4$, in 20 ml H$_2$O is added to 56.70 grams of the BaO-Al$_2$O$_3$ powder (mol ratio 17.0) from Example 1. After rinsing with an additional 20 ml H$_2$O and mixing thoroughly, the mix is dried partially under a heat lamp, transferred to an oven, and heated for 4 hours at 110° C. Calcining of a portion at 1200° C. for 4 hours gives a composite of 5.3 mol % Ba, 5.3 mol % Zr, and 89.4 mol % Al$_2$O$_3$. The surface area after such calcining is found to be 59.2 m$^2$/g.

EXAMPLE 5

Additional BaO-ZrO$_2$-Al$_2$O$_3$ composites were prepared by procedures similar to those of Example 4. A calcined composite of 2.3 mol % Ba, 4.7 mol % Zr, and 93.0 mol % Al$_2$O$_3$ had a surface area of 50.4 m$^2$/g, while a composite of 2.4 mol % Ba, 2.4 mol % Zr, and 95.2 mol % Al$_2$O$_3$ gave a surface area of 35.8 m$^2$/g.

EXAMPLE 6

A strontia-zirconia-alumina mixture is prepared by placing 4.23 grams of Sr(No$_3$)$_2$ in 20 ml H$_2$O, and adding 8.59 grams of Zr(NO$_3$)$_2$ in 50 ml H$_2$O and 7.5 grams Al(NO$_3$)$_2$ in 20 ml H$_2$O. This combined solution is added to 84.0 grams of gamma Al$_2$O$_3$ in a rotating evaporating dish, 10 ml of rinse $H_2O$ also being added. Drying is carried out at 110° C. for 1 hour, then at 300° C. for 16 hours. A portion then is fired at 1200° C. for 4 hours, giving a composite of 2.4 mol % Sr, 2.4 mol % Zr and 95.2 mol % $Al_2O_3$. The surface area of the calcined composite is 49.3 m$^2$/g.

EXAMPLE 7

A strontia-silica-alumina composite is prepared, having a mol ratio of 3.1% Sr, 3.1% Si, and 93.8 $Al_2O_3$. 537 grams of 94.96% $Al_2O_3$ (5.0 mols) are weighed out, this material having a pore volume of 1.28 cc per gram. 35.27 grams (0.167 mol) of $Sr(NO_3)_2$ are dissolved in $H_2O$ diluted to 687 ml and the solution added to the $Al_2O_3$, mixing thoroughly. After addition of 83 ml $H_2O$ to increase pliability and mixing well, the material is dried under a heat lamp and then overnight at 110° C. 33.38 grams of Ludox silica (30% $SiO_2$, 0.167 mol) in 700 ml $H_2O$ then are added and the mixture dired overnight. One portion of this sample is calcined at 1000° C. for 4 hours, and the surface area found to be 71.2 m$^2$/g. However, another sample heated at 1200° C. for 4 hours is found to have a surface area of 26.0 m$^2$/g.

EXAMPLE 8

A strontia-tin oxide-alumina material is prepared by weighing out 58.6 grams of the $SrO-Al_2O_3$ powder (5.48 weight % SrO) prepared in Example 3 and adding 6.61 grams of $SnCl_2.4H_2O$, the tin salt being dissolved in 70 ml $H_2O$ containing 10 drops of conc. HCl. The resulting mixture is quick-dried with a heat lamp and dried overnight at 110° C., then ground and heated for 4 hours at 1200° C. The calcined composite contains 5 mol % Sr, 5 mol % Sn, and 90 mol % $Al_2O_3$. Its surface area is found to be 56.7 m$^2$/g.

EXAMPLE 9

Another strontia-tin oxide-alumina composite is prepared using procedures similar to those of Example 8, but using the materials in proportions giving closely 3 mol % Sr, 3 mol % Sn, and 94 mol % $Al_2O_3$. When the product is calcined for 4 hours at 1200° C., measurements give a surface area of 43±2 m$^2$/g.

EXAMPLE 10

A barium oxide-tin oxide-alumina composite is prepared. Using the $BaO-Al_2O_3$ material (mol ratio 17.0) prepared in Example 1, 56.76 grams are weighed out, containing 0.0300 mol Ba and 0.51 mol $Al_2O_3$, to which is added 6.77 grams (0.0300 mol) of $SnCl_2.2H_2O$, 10 ml conc. HCl, and 50 ml $H_2O$. After mixing thoroughly, the slurry is dried partially under a heat lamp, followed by additional drying at 110° C. for 3 hours. The sample is ground to a powder with mortar and pestle, then calcined at 1200° C. for 4 hours to give a composite of 5.3 mol % Ba, 5.3 mol % Sn, and 89.4 mol % $Al_2O_3$. The surface area is found to be 48.7 m$^2$/g.

EXAMPLE 11

A composite is prepared containing $La_2O_3$, $SiO_2$, and $Al_2O_3$. 81 ml conc. nitric acid is measured into a beaker to which is added slowly 54.3 grams of $La_2(CO_3)_3$ with stirring and evolution of $CO_2$. After dilution to 500 ml with deionized water, the lanthanum solution is set aside. Separately an amount of 42 grams of Ludox LS aqueous colloidal silica (30% by weight $SiO_2$) is diluted to 100 ml to provide a suitable colloidal solution of silica, which is added to the lanthanum solution with stirring and diluted to 1000 ml with $H_2O$. A mixer muller is loaded with 976 grams of precalcined gamma alumina (−40 mesh) and the solution of lanthanum and colloidal silica is added into the muller. After mixing for 1 hour, 70 ml additional $H_2O$ are added, and the wetted mixture transferred to Pyrex dishes and dried at 180° F. for over 12 hours. A portion of the product is calcined at 1200° C. for 4 hours, the composite produced containing 2.4 mol % La, 2.4 mol % Si, and 95.2 mol % $Al_2O_3$. The surface area is found to be 42.8 m$^2$/g. Substantially higher surface area characteristics may be obtained by calcining other portions at appropriate lower temperatures, giving composites suitable for making catalysts useful in carrying out reactions at somewhat less elevated temperatures.

EXAMPLE 12

A lanthana-tin oxide-alumina composite is prepared. To 85 grams of gamma $Al_2O_3$ is added a solution containing 12.87 grams of $La(NO_3)_3.6H_2O$ with 6.85 grams of $SnCl_2.2H_2O$ and 20 ml conc. HCl, followed by addition of 60 ml $H_2O$. The product is dried initially on a turntable with a heat lamp and heated at 110° C. overnight. Heating at 1200° C. for 4 hours formed a calcined composite of 3.3 mol % La, 3.3 mol % Sn, and 93.4 mol % $Al_2O_3$. The surface area of this composite is 37.7 m$^2$/g.

EXAMPLE 13

With reference to Example 11, another composite is formed, using a different lanthanum solution to produce a composite again having the approximate proportions of 2.4 mol % La, 2.4 mol % Si, and 95.2 mol % $Al_2O_3$. Measurement of surface area after heating at 1200° C. for 4 hours shows 51.7 m$^2$/g, which is somewhat higher than that found in Example 11. Using similar procedures, another composite having the approximate proportions of 4.7 mol % La, 2.3 mol % Si, and 93.0 mol % $Al_2O_3$ is prepared and fired at 1200° C. for 4 hours; the surface area of this composite is found to be exceptionally high at 61.8 m$^2$/g.

There exists X-ray evidence indicating that composites contaning oxidic tin, when calcined in air at temperatures as high as 1200° C., contain tin in the form of stannic oxide, $SnO_2$, rather than the stannous oxide, SnO. In terms of the function, properties and surface area characteristics of the composites it is believed to be of no consequence that some or all of the tin may be present as stannic tin in the calcined material, and similar compositions calcined under similar conditions are considered to be equivalents for the purposes of this invention whether or not the tin may be determined to be present in a more highly oxidized state.

EXAMPLE 14

The uncalcined $La_2O_3-SiO_2-Al_2O_3$ material of Example 11 is calcined at 1000° C. for 4 hours. After such calcination, 1001 grams of the powder is recovered and is found to have a surface area of 88.6 m$^2$/g.

250 grams of this powder are slurried in a ball mill with sufficient added $H_2O$ to provide slurry density of approximately 1.5 g/ml. The slurry is milled 17 hours until the viscosity is less than 20 cp. Into this slurry is dipped a zircon-mullite honeycomb of square cross section in the shape of a cube 3 inches on a side to provide a wash coat of the stabilized composite. The block is blow off, dried and calcined at 500° C. The coated honeycomb weighs 332.3 grams and contains 13.0 weight %, or 1.59 grams per cubic inch, of the La$_2$O$_3$-SiO$_2$-Al$_2$O$_3$ slip.

A catalyst composition including as support this stabilized composite coated on the honeycomb is prepared containing precious metals in combination with a base metal. A solution of palladium nitrate, potassium chloroplatinate and zirconyl nitrate is prepared (ratio by wt. 8Pd/1Pt/1Zr) containing 156.2 grams of metal per liter of solution. The slip-coated block is impregnated in this solution for 15 minutes at room temperature, draining and blowing off excess solution with air. The resulting weight is 437.1 g indicates a net gain of 23.9% wet. The block is wrapped in plastic and aged for 2 hours, then hydrolized in 1100 ml of 2% NaHCO$_3$ in ethylene glycol for 5 minutes at 150° C. to 180° C. It is removed and immersed in water for 5 minutes to cool, then rinsed in deionized water until the catalyst is chloride-free, and dried at 120° C. A catalyst cylinder is then cored out for determining activity as a combustion catalyst.

EXAMPLE 15

To illustrate preparation of a base metal catalyst on a stable support. Materials (1) 4590 grams of pulverized -50 mesh gamma Al$_2$O$_3$, (2) 558 g of Sr(NO$_3$)$_2$, (3) 502 g of SnCl$_2$ (mol ratio Al$_2$O$_3$/Sr/Sn=17/1/1)

Procedure: Dissolve 558 g of Sr(NO$_3$)$_2$ in 4 liters deionized water. Add 1 liter water (5 l total). Charge the 4590 gm gamma Al$_2$O$_3$ powder in a Ross mixer and add the Sr(NO$_3$)$_2$ solution. During mixing, an additional 325 ml H$_2$O is added. Dry the mass in steam bath 2.5 hr. and pass crushed material through a #4 screen. Dry the material overnight at 120° C. Yield 5166 g.

To half this batch, 2583 g, is added a solution of 251 g SnCl$_2$ dissolved in 50 g conc. HCl diluted to 2500 ml. Mix 30 minutes in Ross Mixer and dry on steam kettle for 3 hr. Repeat with 2nd half of batch. Total yield (5723 g) is pulverized to −40 mesh. Take 2000 gms. of powder, moisten and extrude in a ⅛ inch extruder until about 1500 g of spaghetti is formed. Dry and calcine for 1 hr. at 1100° C. (Final Yield 822 g). The pore volume is 0.5 cc/g and the surface area is 98 m$^2$/g. For preparation of the active catalyst, a 15% NiO on this Sr/Sn/Al$_2$O$_3$ support is made as follows: (1) Weigh out 367 g of above extrudate (2) also weigh out 253 g Ni(NO$_3$)$_2$·6H$_2$O. Dissolve the 253 g Ni(NO$_3$)$_2$ in deionized water at 50° C. and dilute to 200 cc. Charge 367 g of Sr/Sn/Al$_2$O$_3$ extrudate in a baffled rotating stirring flask and add gradually the Ni salt solution, rotating constantly, and finally evacuating to remove last traces of free moisture. Dry overnight at 250° F. The catalyst is then calcined in air at 240° C. followed by heating for 2 hours at 480° C. The final B.E.T. area equals 40.4 m$^2$/g. This catalyst can be used, for example, in hydrogenation reactions after prior reduction. In this example, the calcined composite itself is catalytically active and may be formed into any suitable shape and employed directly without any need for an inert substrate.

The catalyst compositions of this invention are well adapted for carrying out combustion of carbonaceous fuels at temperatures of about 1100° C. and higher in the presence of a catalyst, utilizing catalytically-supported thermal combustion in accordance with U.S. Pat. No. 3,928,961 of W. C. Pfefferle, assigned to the assignee hereof. Application of the catalyst of this invention to such combustion may utilize the conditions described with reference to other heat-stabilized catalyst compositions in the aforementioned U.S. Pat. Nos. 3,966,970 and 4,056,489. For such an application a preferred precious metal for incorporation in the calcined composite is a platinum group metal such as a mixture of platinum and palladium.

Other applications of the catalyst compositions of this invention may be found in catalytic oxidation, for example, the oxidation of uncombusted hydrocarbons and CO present as pollutants in the exhaust gases of internal combustion engines. For this purpose a base metal material such as copper chromite advantageously may be incorporated in the heat-stabilized composite to form the catalyst.

What is claimed is:

1. A catalyst composition consisting essentially of (a) a catalytically active calcined composite of alumina; a first metal oxide component selected from the group consisting of an oxide of a metal selected from the group consisting of strontium, barium, and lanthanum, and mixtures thereof; and a second metal oxide component selected from the group consisting of (i) an oxide of a metal selected from the group consisting of silicon, tin, and zirconium, and mixtures thereof, and (ii) an oxide of molybdenum, said composite having been formed by calcination of alumina in admixture with said metal oxide components at a temperature of at least 500° C. and being characterized by a surface area of at least 20 m$^2$/g when heated from four hours at 1200° C.; and (b) a material selected from the group consisting of precious metals, base metals or base metal oxides, and precious metals in combination with base metals or their oxides, incorporated in catalytically effective amount in said calcined composite.

2. The catalyst composition of claim 1 in which the material (b) incorporated in the composite after calcination at a temperature of at least 500° C. is a platinum group metal.

3. The catalyst composition of claim 1 in which the material incorporated in said calcined composite is selected from the group consisting of platinum, palladium, platinum-palladium alloys, and mixtures thereof.

4. The catalyst composition of claim 1 in which said calcined composite consists essentially of alumina, barium oxide or strontium oxide or a mixture thereof, and molybdenum trioxide.

5. The catalyst composition of claim 1 in which said calcined composite consists essentially of alumina, barium oxide or strontium oxide or a mixture thereof, and zirconia.

6. The catalyst composition of claim 1 in which said calcined composite consists essentially of alumina, barium oxide or strontium oxide or a mixture thereof, and silica.

7. The catalyst composition of claim 1 in which said calcined composite consists essentially of alumina, barium oxide or strontium oxide or a mixture thereof, and tin oxide.

8. The catalyst composition of claim 1 in which said calcined composite consists essentially of alumina, lanthana, and silica.

9. The catalyst composition of claim 1 in which said calcined composite consists essentially of alumina, lanthana, and tin oxide.

10. The catalyst composition of claim 1 in which the material incorporated in said calcined composite comprises at least one of the transition metals iron, nickel and cobalt.

* * * * *

UNITED STATES PATENT AND TRADEMARK OFFICE
CERTIFICATE OF CORRECTION

PATENT NO. : 4,220,559
DATED : September 2, 1980
INVENTOR(S) : POLINSKI, Leon M.

It is certified that error appears in the above-identified patent and that said Letters Patent are hereby corrected as shown below:

On face page, in the Abstract, lines 6 and 7, correct the spelling of "combinstion" to read --combination--

Column 4 line 12, change "$M^2/g$" to --$m^2/g$--.

Column 5, line 57, change "are" to --is--;

line 58, change "is" to --are--.

Column 6, line 13, change ""$(NH_4)_6Mo_7O_{24} \cdot 4H_3O$" to --$(NH_4)_6Mo_7O_{24} \cdot 4H_2O$"--

Column 7, line 19, change "dired" to --dried--

Column 8, line 67, change "blow" to --blown--.

Signed and Sealed this

Twenty-first Day of April 1981

[SEAL]

Attest:

RENE D. TEGTMEYER

Attesting Officer    Acting Commissioner of Patents and Trademarks